United States Patent
Hoffey et al.

(10) Patent No.: US 9,456,594 B2
(45) Date of Patent: Oct. 4, 2016

(54) ADJUSTABLE FLY FISHING ROD SYSTEM WITH TRANSVERSELY LOADABLE LINE GUIDES

(71) Applicants: James J. Hoffey, Brookfield, MA (US); Thomas M. Hoffey, Jr., Holden, MA (US)

(72) Inventors: James J. Hoffey, Brookfield, MA (US); Thomas M. Hoffey, Jr., Holden, MA (US)

(*) Notice: Subject to any disclaimer, the term of this patent is extended or adjusted under 35 U.S.C. 154(b) by 196 days.

(21) Appl. No.: 14/523,737

(22) Filed: Oct. 24, 2014

(65) Prior Publication Data

US 2016/0113258 A1    Apr. 28, 2016

(51) Int. Cl.
*A01K 87/00* (2006.01)
*A01K 87/02* (2006.01)
*A01K 87/08* (2006.01)

(52) U.S. Cl.
CPC ............. *A01K 87/02* (2013.01); *A01K 87/08* (2013.01)

(58) Field of Classification Search
CPC ...... A01K 87/04; A01K 87/08; A01K 87/00; A01K 87/005; A01K 89/003; A01K 87/002; A01K 87/025
USPC .................................................. 43/18.1 CT
See application file for complete search history.

(56) References Cited

U.S. PATENT DOCUMENTS

| | | |
|---|---|---|
| 754,094 A | 3/1904 | Roth |
| 1,595,275 A | 8/1926 | White |
| 2,018,923 A | 10/1935 | Potter |
| 2,232,107 A | 2/1941 | Gall |
| 2,328,541 A | 9/1943 | Bachlotte |
| 2,536,388 A | 4/1944 | Murray |
| 2,398,862 A | 4/1946 | Sarkisian |
| 2,573,647 A | 10/1951 | Marke |
| 2,623,317 A | 12/1952 | De Maria |
| 2,702,959 A | 3/1955 | Wogtesworth |
| 2,775,054 A | 12/1956 | Shinbane |
| 2,778,141 A | 1/1957 | Haas |
| 2,992,506 A | 7/1961 | Garbolino |
| 3,073,055 A | 1/1963 | Edwards et al. |
| 3,121,290 A | 2/1964 | Brown |
| 3,210,881 A | 10/1965 | Wilson |
| 3,403,468 A | 10/1968 | Bartoletti |
| 3,447,254 A | 6/1969 | Sobel et al. |

(Continued)

FOREIGN PATENT DOCUMENTS

| | | |
|---|---|---|
| CN | 202 999 104 U | 6/2013 |
| CN | 203 015 668 U | 6/2013 |

(Continued)

*Primary Examiner* — Shin Kim
(74) *Attorney, Agent, or Firm* — Davis, Malm & D'Agostine, P.C.

(57) ABSTRACT

A modular fly fishing rod system includes elongated rod blanks configured for mutual end-to-end removable engagement, with adjacent rod blanks having mutually distinct transverse cross-sections to form a rod portion extending from a proximal end having a relatively large transverse cross-section, to a distal end having a relatively small transverse cross-section. The rod blanks include intermediate rod blanks and a tip top rod blank, in which each intermediate rod blank has one or more helical line guides configured to permit the fishing line to be moved transversely into and out of engagement therewith. A handle has a reel seat to support a fishing reel, and a chuck configured to releasably engage any of the rod blanks, wherein the handle may be selectively used with the tip top rod blank alone or with one or more of the intermediate rod blanks engaged therebetween to selectively vary the length of the rod portion.

21 Claims, 6 Drawing Sheets

(56) References Cited

U.S. PATENT DOCUMENTS

| | | |
|---|---|---|
| 3,468,052 A | 9/1969 | Hardesty et al. |
| D223,662 S | 5/1972 | Coalson |
| 3,975,855 A | 8/1976 | McKeown |
| 4,044,488 A | 8/1977 | Ohmura |
| 4,067,133 A | 1/1978 | Livingston |
| 4,183,163 A | 1/1980 | Reimer |
| 4,215,504 A | 8/1980 | Ohmura |
| D256,714 S | 9/1980 | Ohmura |
| 4,398,369 A | 8/1983 | Wiebe |
| D270,932 S | 10/1983 | Yamamoto |
| D273,692 S | 5/1984 | Ohmura |
| 4,467,548 A | 8/1984 | Tabor |
| D280,656 S | 9/1985 | Ohmura |
| 4,648,196 A | 3/1987 | Moody |
| D301,501 S | 6/1989 | Kim |
| 4,860,485 A | 8/1989 | Rhoton et al. |
| 4,903,427 A | 2/1990 | Yamato |
| 5,012,607 A | 5/1991 | Meschkat |
| D327,940 S | 7/1992 | Kobiyama |
| 5,259,140 A | 11/1993 | Epperson |
| 5,263,275 A | 11/1993 | Rumbaugh |
| 5,291,683 A | 3/1994 | Yamato |
| 5,317,829 A | 6/1994 | Balkcom |
| 5,355,611 A | 10/1994 | Dahlberg et al. |
| 5,535,539 A | 7/1996 | Vetre |
| 5,802,759 A | 9/1998 | Ohmura |
| D409,713 S | 5/1999 | Ohmura |
| 5,950,346 A | 9/1999 | da Rosa |
| 5,953,847 A | 9/1999 | Peterson |
| 5,974,722 A | 11/1999 | Kiser |
| 6,115,955 A | 9/2000 | Sledge |
| 6,269,585 B1 | 8/2001 | Yasui et al. |
| 6,612,065 B1 | 9/2003 | Blanchette et al. |
| D484,216 S | 12/2003 | Park |
| D494,249 S | 8/2004 | Grayson |
| 6,851,216 B2 | 2/2005 | McCoy |
| D643,903 S | 8/2011 | Akiba |
| D672,007 S | 12/2012 | Thomas |
| 8,333,030 B2 | 12/2012 | Jeong |
| 2005/0076555 A1 | 4/2005 | Letouche |

FOREIGN PATENT DOCUMENTS

| | | |
|---|---|---|
| CN | 203 015 669 U | 6/2013 |
| WO | WO 2005 086996 A1 | 9/2005 |

ADJUSTABLE FLY FISHING ROD SYSTEM WITH TRANSVERSELY LOADABLE LINE GUIDES

BACKGROUND

1. Technical Field

This invention relates to fly fishing rods and particularly to an adjustable fly fishing rod system having transversely loadable line guides to quickly form different length rods for different uses.

2. Background Information

Throughout this application, various publications, patents and published patent applications are referred to by an identifying citation. The disclosures of the publications, patents and published patent applications referenced in this application are hereby incorporated by reference into the present disclosure for all purposes.

It is a usual practice to carry several different types of rods, e.g., of different lengths, if an angler expects to fish under different conditions. In this regard, a common problem faced by people involved in the sport of fly fishing is that not a single type of fly fishing rod is appropriate for fishing every fish species, or every fishing venue, therefore more than one type of fishing rod is generally needed to be carried when it is desired to fish different species and/or different sized bodies of water such as streams, rivers, ponds and lakes. Different types of handles, e.g., by weight, may also be preferred by different anglers depending upon the fishing venue, conditions and rod length. In addition, some rods can be rather cumbersome and difficult to carry and store in space restrictive circumstances such as camping, canoeing, kayaking, hiking, trekking, bushwacking, snowshoeing, etc. Packing and transporting this different equipment may thus become burdensome and inconvenient, as well as expensive. Furthermore, being without the proper rod for the venue, fish species or conditions can be frustrating and make catching fish nearly impossible.

These problems are exacerbated for active people who may wish to combine fishing with more active pursuits such as mountain biking, trail running, mountain climbing, etc. For example, if someone wants to bike to a pond, hike to a stream, or run a mile up river to a "secret spot", it is difficult, if not impossible to do so with most conventional fishing rods.

There have been attempts to resolve some of these problems. One approach, for example, is to provide a collapsible or telescoping fishing rod in which sections collapse into one another to vary the length of the rod. The rod is intended to be compact enough for convenient transport in its collapsed state, and then extended to an optimal length for the particular fishing venue. A drawback of this approach, however, is that telescoping fishing rods tend to be mechanically complex and prone to breakage. They also tend to be disproportionately heavy when used at relatively short lengths, since although shorter, the collapsed rod weighs the same as when it is extended to its full length. Moreover, although such rods may be extended to various lengths, the telescoped sections provide the rod with inconsistent flexural characteristics which vary depending on the degree of overlap of the various telescoping sections, making them difficult to cast reliably and consistently, particularly when fly fishing.

Rods may also be provided with removable sections that may be selectively removed to vary the length of the rod. A drawback of this approach is that the fishing line needs to be removed from the rod's line guides prior to adding or removing sections. This generally requires one to first cut off the artificial fly, to permit the line to be pulled out of the guides. Then after sections are added or removed, the line needs to be re-threaded axially through each of the line guides, and the fly then re-tied to the line. This is a cumbersome and potentially frustrating procedure that does not lend itself to being performed quickly and easily in the field, and risks losing the fly and tangling the fishing line, spooking/frightening the fish and wasting time. Furthermore, time spent removing a fly, removing fishing line, decreasing or increasing the length of the fishing rod and then retying the fly significantly diminishes the greatest commodity for any angler—time spent fishing. Lastly, a cumbersome process as described in the preceding sentence does not lend itself to easy use by the active angler who likes to seek distant, unknown and/or otherwise hard to reach fishing locations as described above.

Therefore, a need remains for a reliable, economic, portable, modular fishing system, which would enable an angler to easily transport a fishing rod to any number of fishing venues, and then quickly modify the fishing rod on site to suit the particular fishing need without sacrificing rod action and fly presentation.

SUMMARY

In one aspect of the invention, a modular fishing rod system includes a plurality of elongated rod blanks configured for mutual end-to-end removable engagement with one another, with adjacent rod blanks having mutually distinct transverse cross-sectional dimensions wherein upon said engagement, the rod blanks form a rod portion of a fishing rod extending in an axial direction from a proximal end having a relatively large transverse cross-sectional dimension, to a distal end having a relatively small transverse cross-sectional dimension. The rod blanks further include a plurality of intermediate rod blanks and a tip top rod blank, in which each intermediate rod blank has one or more helical line guides having a helix axis extending parallel to the axial direction, for supporting a fishing line passing therethrough. The helical line guides are configured to permit the fishing line to be moved transversely into and out of engagement therewith. The tip top rod blank includes a tip top in the form of a loop configured to support the fishing line passing therethrough. A handle has a reel seat to support a fishing reel, and a chuck configured to releasably engage any of the rod blanks, wherein the handle may be selectively used with the tip top rod blank alone or with one or more of the intermediate rod blanks engaged therebetween to selectively vary the length of the rod portion without requiring the fishing line to be re-threaded axially through the line guides as intermediate rod blanks are added or removed.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

General Overview

Embodiments of the invention include an interchangeable fishing rod system configured for being disassembled into a small package for easy transport, such as during athletic pursuits such as camping, canoeing, kayaking, running, hiking, trekking, bushwacking, snowshoeing, mountain biking, etc., and then being assembled into various lengths without the use of telescoping rod sections, and without having to remove hooks or flies prior to running fishing line through line guides spaced along the length of the rod.

In this regard, an aspect of the invention was the inventors' recognition that adventurous and/or athletically oriented anglers would welcome a tool capable of permitting them to walk, hike, trek, run, bushwack, snowshoe, mountain bike, canoe or kayak to remote streams, rivers, ponds or lakes, and then experience the joy and peace of fishing with a high quality rod of various lengths upon arrival. The inventors thus recognized that such a tool would enable fishing to be combined with various sporting activities, whether it is biking, bushwhacking, trail blazing, mountain climbing, kayaking, etc. They also recognized that transporting a conventional 9 ft. fly fishing rod for open bodies of water and long casts along with a conventional shorter fly fishing rod for smaller streams, tight spaces and shorter casts, along with the related equipment while engaging in those other activities would be impractical at best.

The goal underlying the invention is to be able to take a single fly rod on a fishing excursion, be that 6 hours, one day or one week, and quickly adapt to the various fishing conditions that an angler may come across. For example if the angler sets out to fish a remote pond that is 3 miles into the woods, it would be desirable to have a rod that is broken down for easy hiking. If the angler crosses a small stream on the way in, he or she might decide to fish a pool or two. However, given the size of the stream, a 5' rod may be all that can be used comfortably. Once arriving at the pond, the user may decide to wet wade, which may only require a 7'6" rod to fish the sections of the pond of interest. However, as the angler walks the pond, he may find that the rising fish are just out of wading reach. A 9' rod may then be desired to cast a further distance. The instant embodiments allow for all of these scenarios and many in between without carrying another rod, or two, or three. All the user needs to do is add or remove a section (rod blank) or two or three, etc., to reach the desired length.

It should be noted that in the foregoing example, when in the pond and deciding to switch from a 7'6" rod to a 9' rod, the user may not have a lot of time before the rising fish stop feeding or move to another location. The user would wish to avoid the frustration of cutting off the fly, removing the line, adding a rod section, rethreading the line, retying the fly and/or dropping the fly or the line while re-lining the rod after changing rod size. These embodiments allow the rod length to be altered by removing or adding sections, while respectively disengaging and engaging the line with the line guides without cutting off the fly, retying the fly, or relining the entire rod.

Figure 1:
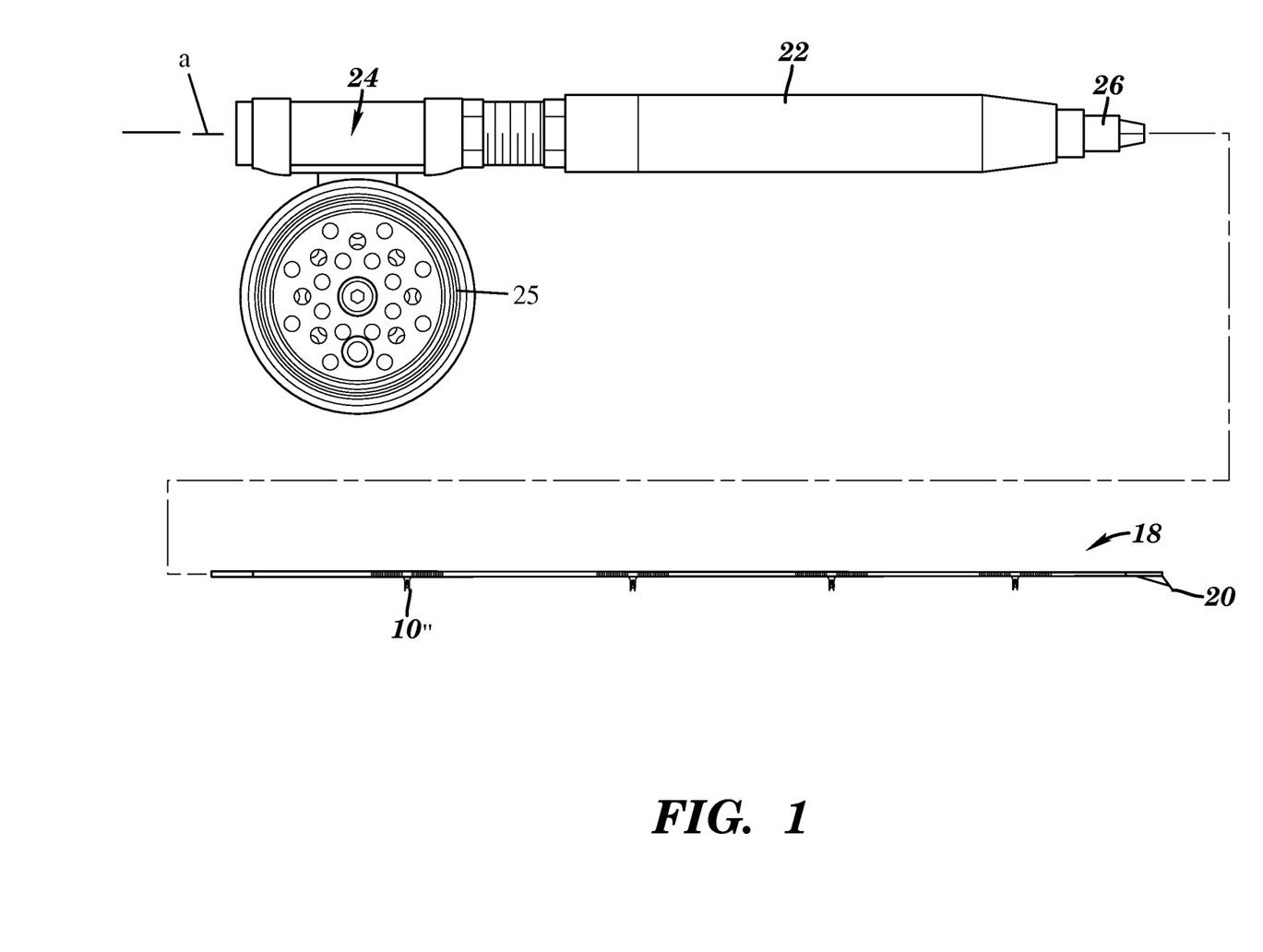
FIG. 1 is an elevational side, exploded, view of an embodiment of the present invention.

In particular embodiments, the system is configured for being easily transported, e.g., in a versatile and flexible "sling", to permit the hiker, biker, trekker and kayaker to have one fishing rod that offers the ability to be conveniently adjusted in the field for a variety of venues. The inventors realized that a significant drawback of prior adjustable length fly fishing rods was that the fishing line first needed to be taken out of each of the line guides before rod blanks could be added or removed. The instant inventors devised helical guides that allow the angler to shorten the rod by quickly removing the line from the line guides of the rod blank(s) to be removed without first having to take the line out of the guides of the remaining rod blanks and cutting off the fly. The same helical guides allow the angler to lengthen the rod by quickly adding a rod blank and simply threading the line through the guide on the added rod blank without removing the line from the entire rod. Depending upon where the user wishes to stop and fish, be it a small stream or an open pond or lake, etc., these embodiments may be changed in length without having to strip the line out of the eyes and retying the fly each time.

Where used in this disclosure, the term "axial" when used in connection with an element described herein, shall refer to a direction relative to the element, which is substantially parallel to the central axis a of handle 22, as shown in FIG. 1, when the element is installed into the handle. Similarly, the term "transverse" refers to a direction other than substantially parallel to the axial direction. The term "transverse cross-section" refers to a cross-section taken along a transverse plane.

Figure 2:
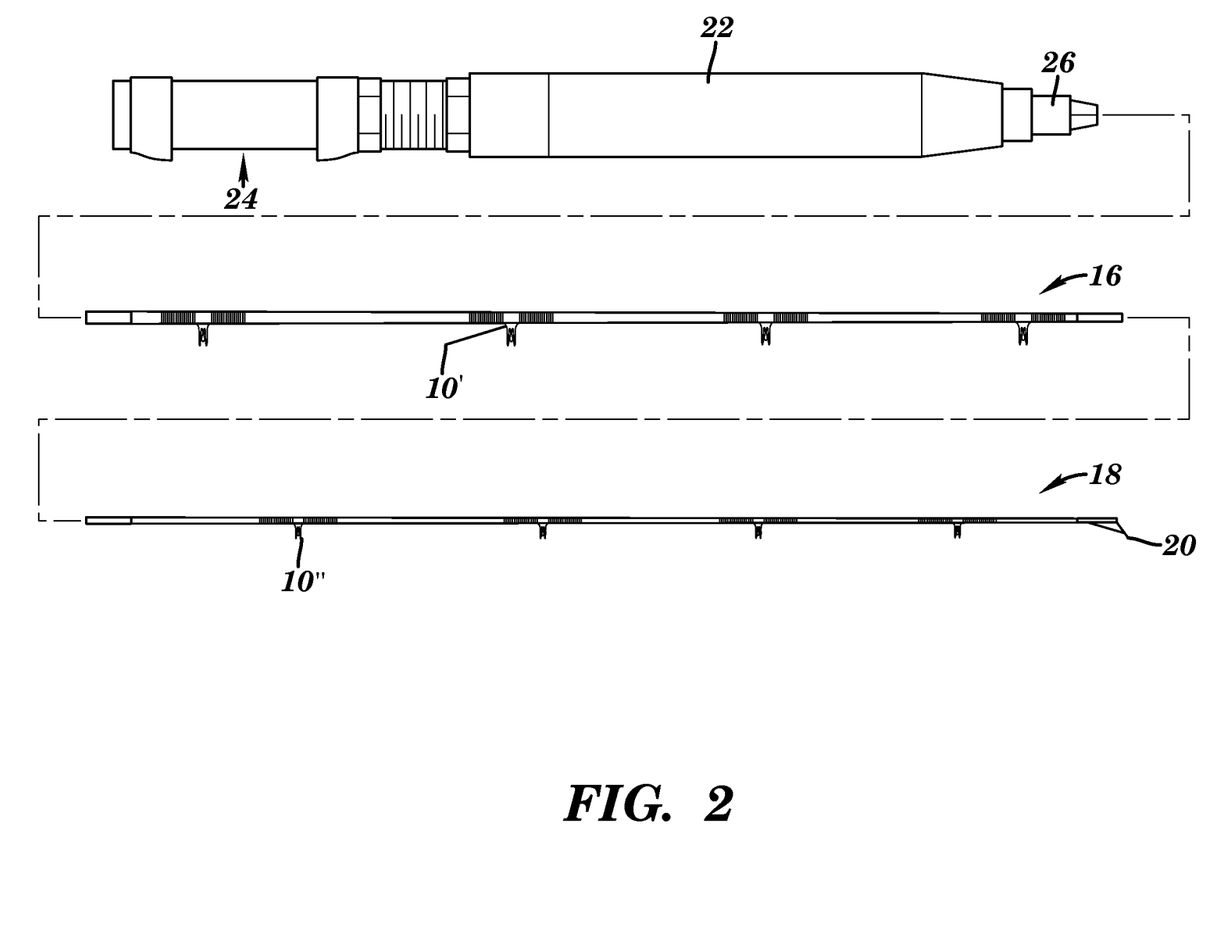
FIG. 2 is a view similar to that of FIG. 1, of an alternate embodiment of the present invention.
Figure 3:
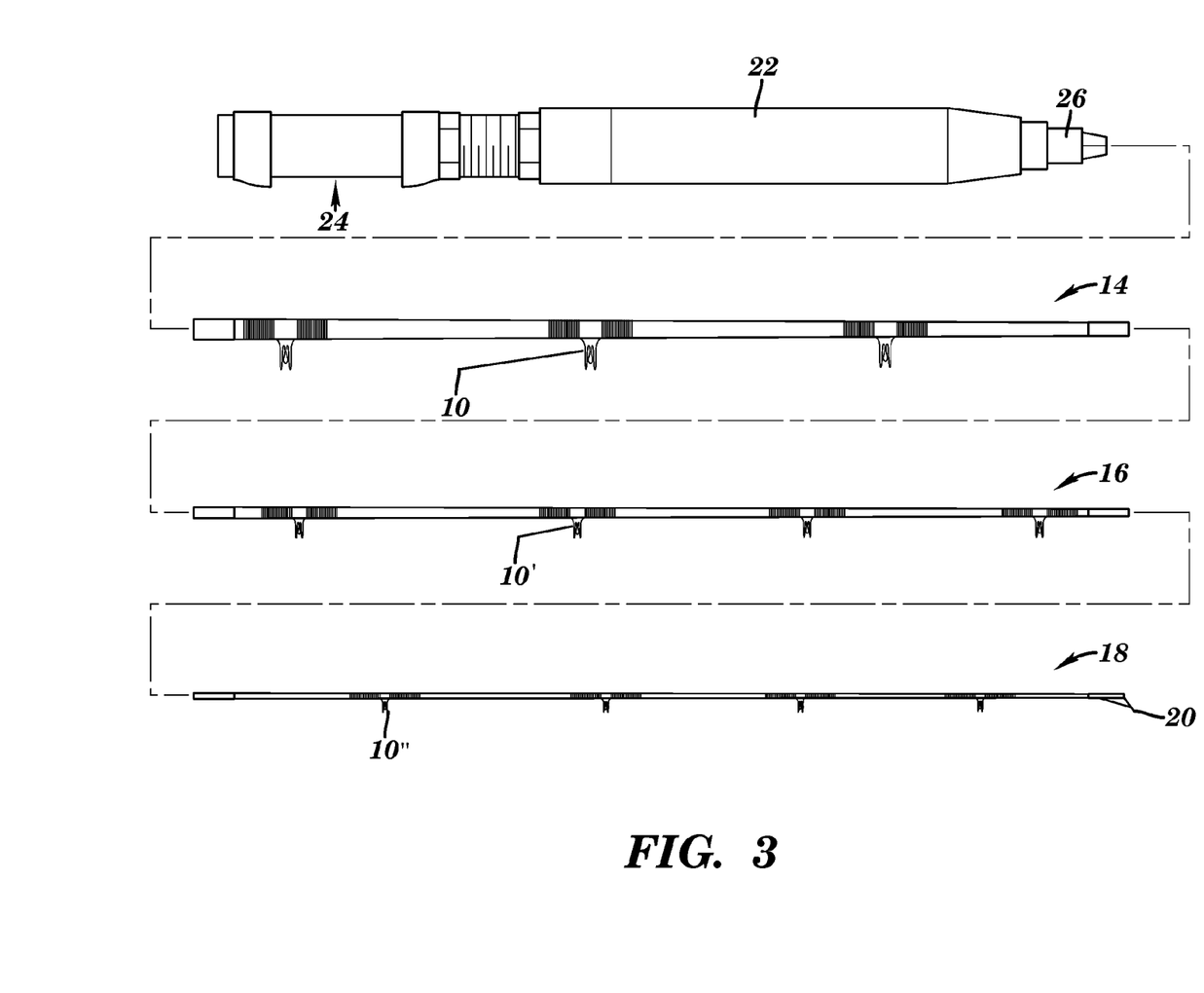
FIG. 3 is a view similar to that of FIGS. 1 and 2, of a further embodiment of the present invention.
Figure 4:
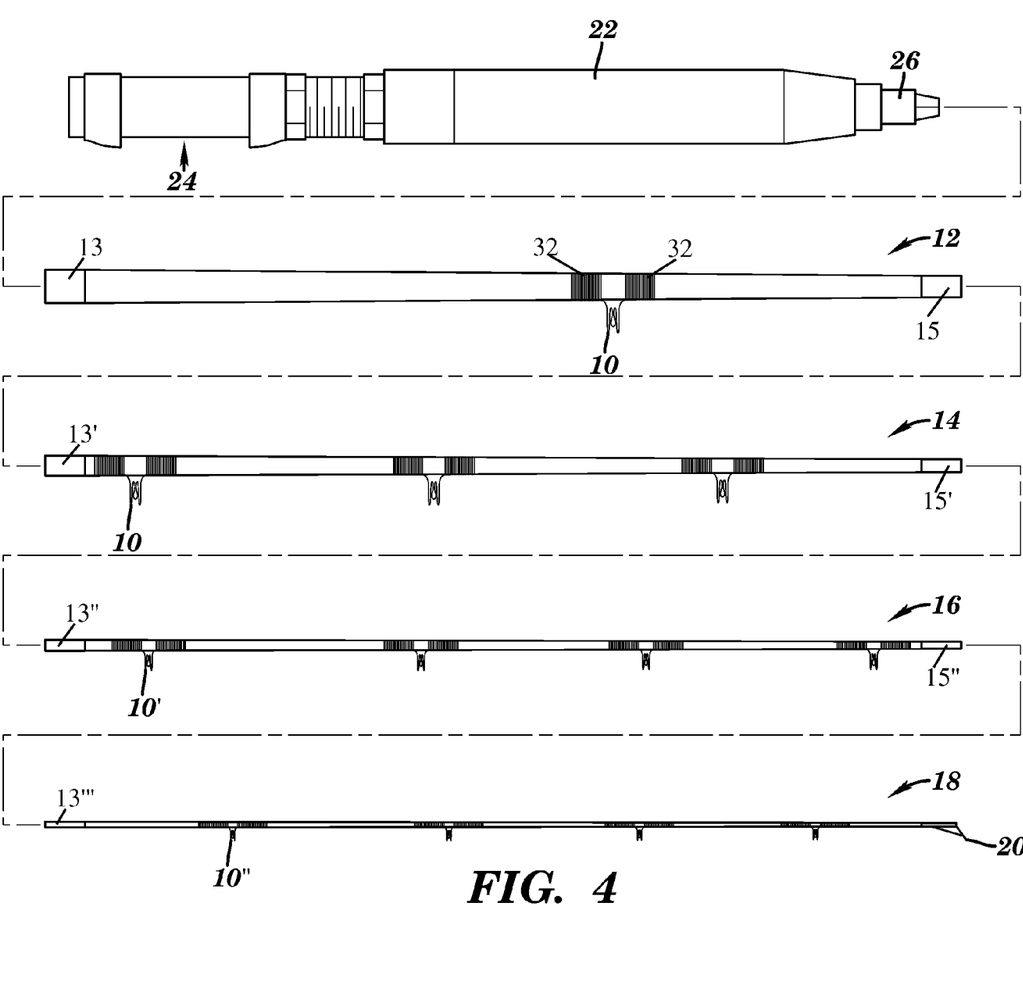
FIG. 4 is a view similar to that of FIGS. 1-3, of yet another embodiment of the present invention.

Referring now to FIGS. 1-7, embodiments of the present invention will be more thoroughly described. Turning initially to FIG. 4, an embodiment of the present invention includes a modular fishing rod system including a plurality of elongated rod blanks 12, 14, 16 and 18, which are configured for mutual end-to-end engagement with one another. The rod blanks may be configured to fit onto one another using any number of conventional approaches, such as shown in U.S. Pat. No. 3,121,290. In a particular embodiment, the rod blanks engage one another with a plug and ferrule arrangement, in which a plug 13, 13', 13", 13''' is disposed at a proximal end of each rod blank, and is configured for receipt within a ferrule 15, 15', 15" disposed at a distal end of an adjacent rod blank and/or within a chuck 26 of a handle 22. In particular embodiments, the rod blanks each taper from a relatively large transverse cross-section at the proximal end, to a relatively small transverse cross-section at the distal end. Moreover, in these embodiments, the rod blanks 12, 14, 16 and 18 have progressively smaller cross-sections, so that upon mutual engagement, the rod blanks collectively form a rod portion of a fishing rod which tapers substantially continuously from the proximal end of rod blank 12 to the distal end of rod blank 18 as shown. It should be recognized that although four rod blanks are shown and described, any number of rod blanks may be provided without departing from the scope of the present invention.

For many applications, the rod blanks are substantially conical in shape, with substantially circular transverse cross-sections. However, other geometries may be provided without departing from the scope of the invention. For example, one or more of the rod blanks may be cylindrical, i.e., without the aforementioned taper. These rod blanks may be provided with progressively smaller transverse cross-sections, to provide a stepped reduction in cross-section along the length of the rod portion, or alternatively, rod blanks may be provided with similar dimensions, so that the cross-section remains consistent along the length of the rod portion. In addition, rod blanks may be provided with non-circular transverse cross-sections, such as oval or polygonal cross-sections.

In various embodiments, the rod blanks include one or more intermediate rod blanks (such as shown at 12, 14 and 16), and a tip top rod blank 18. The tip top rod blank 18 is substantially similar to the intermediate rod blanks, but for the use of a conventional tip top guide 20 disposed at the distal end thereof. Tip top guide 20 is configured in a conventional manner to form a closed loop through which a fishing line passes.

Each of the intermediate rod blanks 12, 14 and 16, and optionally, tip top blank 18, has one or more helical line guides 10, 10', 10" disposed thereon. The guides 10, 10' and 10" are substantially similar to one another, except for their size, with guide 10' being smaller than guide 10, and guide 10" being smaller than guide 10', etc., as shown. In particular embodiments, the sizes of the line guides are generally proportional to the cross-sectional dimensions of the rod blanks, so that the largest line guides 10 are disposed at the proximal end of the rod portion, and progress along the length of the rod portion to the smallest line guides disposed on the tip top rod blank 18.

There is theoretically no limit to the number and lengths of the rod blanks and the number of line guides (helical or conventional) disposed thereon. Particular embodiments include three to four rod blanks of about 2.5 to 3 feet in length, with each rod blank having from one to five line guides. The total number of line guides is typically one to three more than the maximum length of the rod portion in feet, with the spacing between guides decreasing the closer they are to the tip top guide 20. The embodiment shown and described includes four rod blanks ranging in length from 2.5 to 3 feet, to produce a 10 to 12 foot rod portion having a total of thirteen line guides, including the tip top guide 20. As shown, the spacing of the line guides ranges from one line guide on rod blank 12, to five line guides, including the tip top guide 20, on tip top blank 18. This configuration provides a rod portion of up to nine feet long, with twelve line guides in FIG. 3, a six foot rod portion with nine line guides in FIG. 2, and a three foot rod portion with five line guides when configured as shown in FIG. 1.

Figure 5:
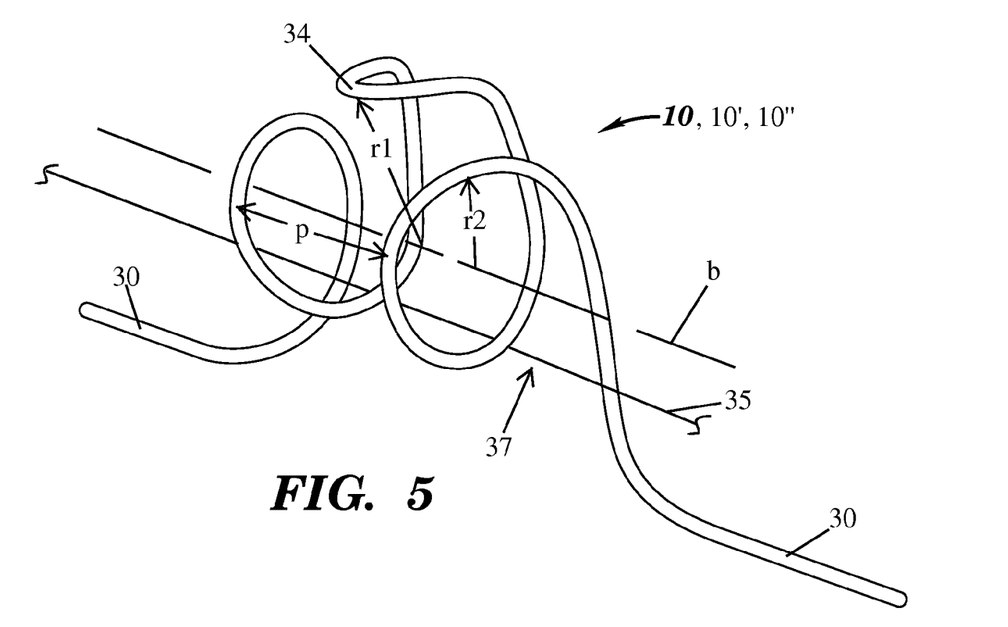
FIG. 5 is a perspective view of a line guide used in the embodiments of FIGS. 1-4.

As best shown in FIG. 5, the helical line guides 10, 10', 10" extend helically to define a central helix axis b configured to extend parallel to the axial direction a (FIG. 4) once the guide tails 30 are secured to the rod blanks, e.g., with conventional windings 32 (FIG. 4). The line guides are configured to support a fishing line passing therethrough along the helix axis b, with windings extending at least a full 360 degrees about the axis b at a radius r2. As also shown, the lines guides are each formed as a mirror image helix which winds continuously from a left-hand helix at one end of the guide, to a bight 34 where it reverses direction, and to a right-hand helix at the other end. The mirror-image helix is thus symmetric about a transverse plane of symmetry passing through the bight 34. Both the left-hand helix and the right-hand helix wind at least a full 360 degrees about axis b. In particular embodiments, the bight 34 is disposed further from axis b than the helical windings, e.g., extending a radial distance r1 from axis b within a range of about 1.5 to 3 times that of the radial distance r2 of the helical windings. Moreover, in particular embodiments, pitch spacing p between adjacent windings is relatively large, e.g., within the same range as radial distance r1, of about 1.5 to 3 times that of radial distance r2 as shown. In particular applications, pitch p, and similarly, r1, may be anywhere from 10 mm to 100 mm, while in particular applications, a range of 15 mm to 50 mm may be desired.

The mirror-image helix with bight portion 34 enables the fishing line to be moved transversely into and out of engagement with the line guides, without the need to remove the line from the tip top guide 20 or any other line guides on rod blanks that are not being added or removed from the assembled rod. In this regard, line may be engaged with the helical guide by initially moving the line 35 transversely underneath the windings as shown at 37, then up and over the bight 34, and then transversely into the space between the bight 34 and the windings, to bring the line 35 into position by which it guided by the windings to extend along helix axis b. The line may be disengaged by reversing this process. The bight 34, particularly when combined with the relatively large radial distance r and pitch spacing p, enable this engagement and disengagement to be effected quickly and conveniently.

Turning back to FIGS. 1-4, a handle 22 is provided with a reel seat 24 configured to support a fly fishing reel 25 (FIG. 1). An example of a reel 25 usable with the various embodiments shown and discussed herein, is the single spool reel disclosed in U.S. Pat. No. 7,832,673, issued to Lee, et al., on Nov. 16, 2010. The handle includes a chuck 26 at one end thereof, to releasably engage the plugs of any of the rod blanks. Chuck 26 may be configured in a manner known to those skilled in the art, such as commonly used for centering and clamping work in a device such as a lathe or other machine tool, or for centering and holding a drill bit in a drill. In particular embodiments, chuck 26 may take the form of a keyless chuck commonly used with cordless electric drills to hold drill bits of various diameters. Chuck 26 thus enables handle 22 to be selectively used with the tip top rod blank 18 alone as shown in FIG. 1, or with one or more of the intermediate rod blanks disposed therebetween to selectively vary the length of the rod portion, such as shown in FIGS. 2-4. It is noted that in each configuration, tip top blank 18 is used, which eliminates any need to re-thread line through tip top guide 20. For this reason, blank 18 may use conventional line guides instead of helical line guides 10" as shown and described herein. However, the use of the helical line guides on intermediate rod blanks 12, 14 and 16 enables these blanks to be added or removed from the rod quickly and easily without requiring the fly to be cut off and retied or the fishing line to be re-threaded through the tip top guide 20 or line guides of remaining rod blanks.

This system allows the fisherman to change the entire length of the rod portion from 10-12 feet to 2.5 to 3 feet in a matter of seconds with the ease of not having to remove the fly itself and subsequently having to retie the fly on the line after the length has been changed. The various lengths allow the fly to be thrown various distances to areas where fish are located and/or to the particular species of fish being targeted. The various lengths also allow an angler to fish in wide open areas where a long rod will be beneficial or tight spots along a stream or under brook side brush cover where a short rod will be beneficial.

Figure 6:
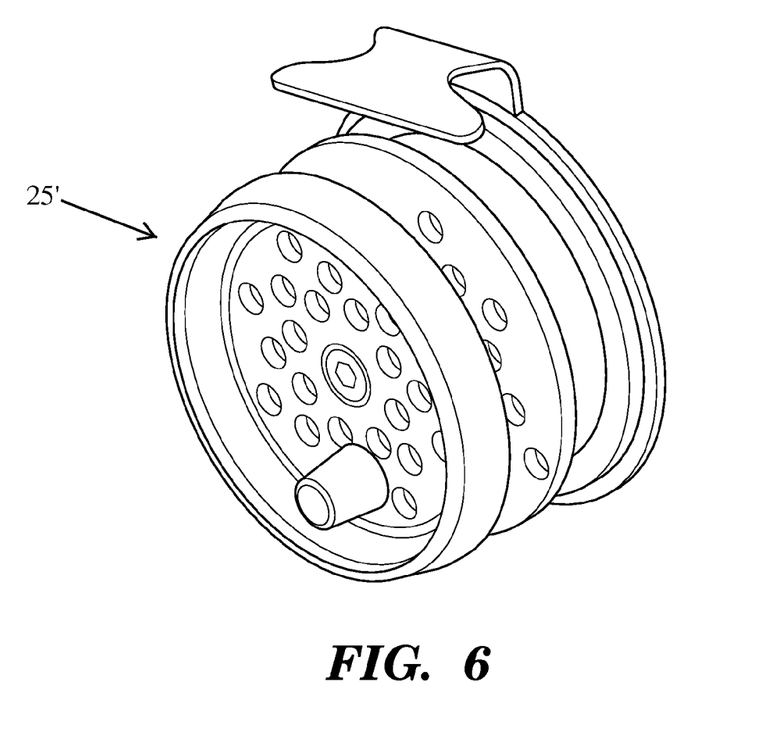
FIG. 6 is a perspective view of an optional reel usable with any of the foregoing embodiments.
Figure 7:
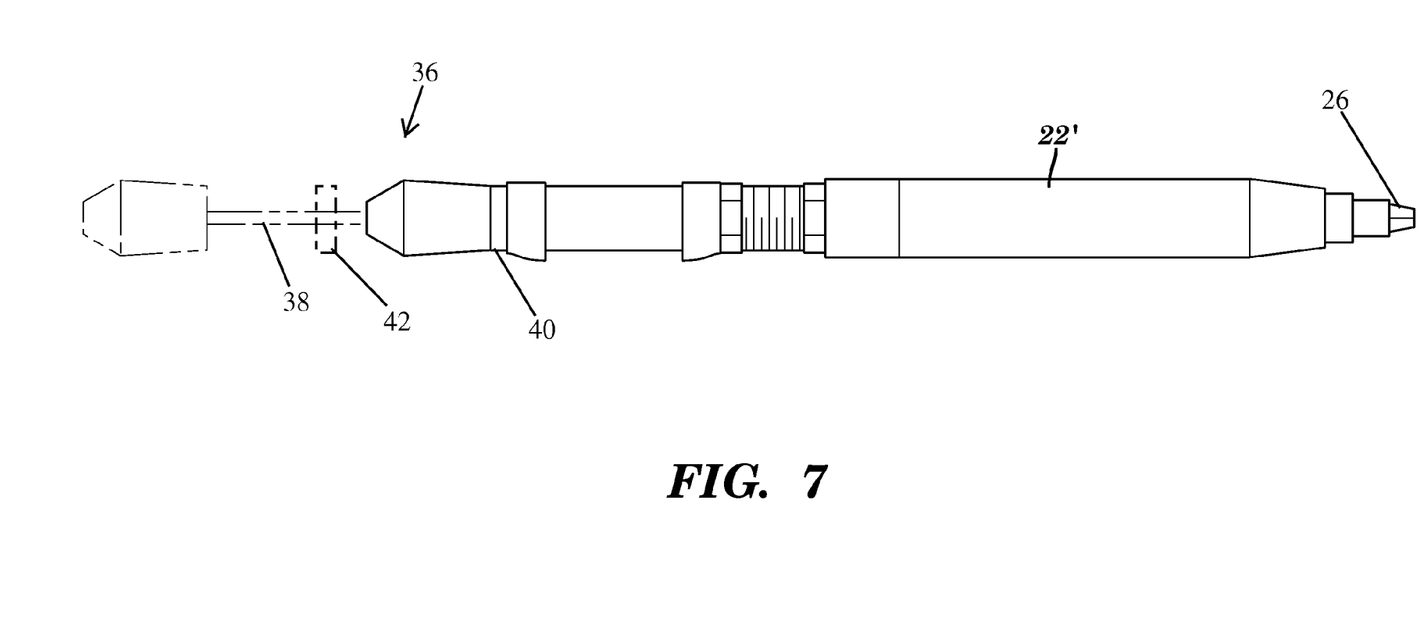
FIG. 7 is an elevational view of a handle with an optional adjustable butt, with the adjustable butt shown in phantom in its extended position.

Turning now to FIGS. 6 and 7, optional embodiments of various aspects of the invention are shown and described. As shown in FIG. 5, a multi-line reel 25' (FIG. 6), such as shown and described in U.S. Pat. No. 7,798,440 may be installed on the handle 22 or 22' as described hereinbelow. Multi-line reel 25' may be used with any of the configurations shown and described with respect to FIGS. 1-4, to provide even greater flexibility by permitting the angler to quickly switch between fishing lines of different weights. For example, when switching from a 5' rod to a 9' rod, the user may wish to use a heavier line and vice versa. So with the double reel one can spool 5-6 weighted line on one side an 8-9 weighted line on the other side. The benefit is that the heavier weighted line will add some distance to the user's cast. Heavier line on a short rod will also increase the casting distance to a certain extent without lengthening the rod. This is good for targeting fish just beyond the reach of a shorter rod, but well within the reach of a longer rod without the need to lengthen the rod. As another example, if the user is casting to rising fish, a floating line may be desired. However, when fishing rapids or a deeper hole, a sinking line or shooting tip line, may be desired. The double reel thus provides quick access to a second line option.

As shown in FIG. 7, any of the foregoing configurations may also use handle 22', which includes a telescoping butt 36 disposed at an end opposite the chuck 26. The telescoping butt is configured for being releasably movable in the axial direction, e.g., by disposing the butt 36 on a shaft 38 which is slidably received within the handle. Once moved, the butt 36 may be locked in position using any convenient means, such as a conventional quick release shaft collar 40. In particular embodiments, the collar 40 includes the QCL— Quick Clamping Shaft Collar available from Ruland Manufacturing Co., Inc. of Marlborough, Mass., although various other types of devices, including set screws or locking pins, etc., may be used without departing from the present invention. Butt 36 may thus be moved from a collapsed position as shown, to an extended position as shown in phantom, or to any position therebetween, to adjust the length of the handle for one handed or two-handed use as in spey casting, etc. Moreover, a series of weights may be disposed about the extended shaft 38, such as in the form of one or more annular/donut shaped discs 42 (shown in phantom) disposed coaxially about shaft 38. Discs 42 may be installed by unclamping collar 40, withdrawing shaft 38 from the handle, inserting the shaft 38 through the center of the annular disc 42, replacing the shaft onto the handle 22', and then re-clamping collar 40. An example of a telescoping butt that may be used in embodiments of the present invention is shown and described in U.S. Patent Application Pub. No. 2014/0115946 to Manley, published on May 1, 2014.

The invention is thus an interchangeable fly fishing rod system that enables the fishing rod to be disassembled into a small package for easy transport (e.g., for camping, canoeing, kayaking, running, hiking, trekking, bushwacking, snowshoeing, mountain biking, etc.), and then enables users to assemble it into any number of various lengths without having to remove and retie the fly and/or re-thread the fishing line through the rod's line guides. The compact nature of the system enables the angler to easily transport the system into different and remote environments that would otherwise not be accessible to the angler using conventional equipment. Whether camping, canoeing, kayaking, running, hiking, trekking, bushwacking, snowshoeing, mountain biking, etc., the fly fishing rod system also allows the angler to couple the "outdoorsman" experience with an athletic pursuit, by permitting the user to leave home with what seems like the bare essentials and arrive at the fishing location with a tool that is configurable for a wide range of conditions. The user is therefore able to combine a workout, such as running or biking, etc., with fishing, making the fishing experience new, different, efficient and more rewarding.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

It should be further understood that any of the features described with respect to one of the embodiments described herein may be similarly applied to any of the other embodiments described herein without departing from the scope of the present invention.

Having thus described the invention, what is claimed is:
1. A modular fly fishing rod system comprising:
  a plurality of elongated rod blanks configured for mutual end-to-end removable engagement with one another, with adjacent rod blanks having mutually distinct transverse cross-sectional dimensions wherein upon said engagement, the rod blanks form a rod portion of a fishing rod extending in an axial direction from a proximal end having a relatively large transverse cross-sectional dimension, to a distal end having a relatively small transverse cross-sectional dimension;
  said plurality of rod blanks further including a plurality of intermediate rod blanks and a tip top rod blank;

each intermediate rod blank having one or more helical line guides disposed thereon, said helical line guides defining a helix axis extending parallel to said axial direction, said line guides configured to support a fishing line passing therethrough along said helix axis;

said helical line guides further configured to permit the fishing line to be moved transversely to the axial direction into and out of engagement with said helical line guides;

said tip top rod blank including a tip top in the form of a loop configured to support the fishing line passing therethrough;

a handle having a reel seat configured to support a fishing reel, the handle having a chuck at one end thereof, the chuck configured to releasably engage any of the rod blanks, wherein the handle may be selectively used with the tip top rod blank alone or with one or more of the intermediate rod blanks engaged therebetween to selectively vary the length of the rod portion without requiring the fishing line to be re-threaded axially through the line guides as intermediate rod blanks are added or removed.

2. The system of claim 1, wherein said rod blanks are configured for end-to-end plug and ferrule engagement with one another.

3. The system of claim 2, wherein a plug disposed at a proximal end of one rod blank is received within a ferrule at a distal end of an adjacent rod blank.

4. The system of claim 3, wherein the rod blanks have substantially circular cross-sectional dimensions.

5. The system of claim 4, wherein the rod blanks are substantially conical, having a relatively large cross-sectional dimensions at proximal ends, and relatively small cross-sectional dimensions at distal ends.

6. The system of claim 1, wherein each of said line guides extends 360 degrees about the helix axis.

7. The system of claim 6, wherein each of said helical line guides is configured as a mirror image helix extending continuously from a left-hand helix at one end to a right-hand helix at the other end.

8. The system of claim 7, wherein the left-hand helix reverses direction to form the right-hand helix at a bight.

9. The system of claim 8, wherein each of said helical line guides is symmetrical about a transverse plane of symmetry passing through said bight.

10. The system of claim 8, wherein the left-hand helix and the right-hand helix each wind at least a full 360 degrees about the helix axis at a predetermined radius.

11. The system of claim 10, wherein the bight portion is disposed further from the helix axis than the predetermined radius.

12. The system of claim 11, wherein the bight is disposed a predetermined distance from the helix axis, the predetermined distance being greater than the predetermined radius.

13. The system of claim 12, wherein the predetermined distance is within a range of about 1.5 to 3 times the predetermined radius.

14. The system of claim 13, wherein windings of said left-hand helix and said right-hand helix are disposed at a pitch spacing within said range of about 1.5 to 3 times the predetermined radius.

15. The system of claim 13, wherein said predetermined distance and said pitch are both at least about 10 mm and as much as about 100 mm.

16. The system of claim 15, wherein said predetermined distance and said pitch are both at least about 15 mm and as much as about 50 mm.

17. The system of claim 1, further comprising a fishing reel disposed on said reel seat.

18. The system of claim 5, further comprising a multi-line reel.

19. The system of claim 1, wherein the chuck comprises a keyless chuck.

20. The system of claim 19, wherein the handle further comprises a telescoping butt disposed at an end opposite the keyless chuck, the telescoping butt disposed on a shaft configured for slidable receipt within the handle in the axial direction to adjust the length of the handle.

21. The system of claim 20, further comprising a plurality of removable, annular weights having a central orifice sized and shaped to receive the shaft therein.

* * * * *